United States Patent [19]

Kitaue

[11] Patent Number: 5,137,277
[45] Date of Patent: * Aug. 11, 1992

[54] HAND HELD VIDEO GAME WITH SIMULATED AIR BATTLE

[75] Inventor: Kazumi Kitaue, Kobeshi, Japan

[73] Assignee: Konami Co., Ltd., Kobe, Japan

[*] Notice: The portion of the term of this patent subsequent to Jun. 9, 2009 has been disclaimed.

[21] Appl. No.: 471,090

[22] Filed: Jan. 26, 1990

[51] Int. Cl.[5] .......................... A63B 67/00; A63F 7/06
[52] U.S. Cl. .................................... 273/85 G; 273/433
[58] Field of Search ...................... 273/85 G, 433, 434

[56] References Cited

U.S. PATENT DOCUMENTS

| | | |
|---|---|---|
| 4,403,216 | 9/1983 | Yokoi . |
| 4,415,153 | 11/1983 | Yokoi . |
| 4,424,967 | 1/1984 | Yokoi et al. . |
| 4,438,926 | 3/1984 | Yokoi et al. . |
| 4,542,903 | 9/1985 | Yokoi et al. . |
| 4,582,322 | 4/1986 | Yokoi et al. . |
| 4,582,323 | 4/1986 | Minkoff et al. ................. 273/85 G |
| 4,895,376 | 1/1990 | Shiung-Fei ..................... 273/85 G |

OTHER PUBLICATIONS

Xerographic copy of hand-holdable LCD game device and back side of associated packaging-Electronic Football.

Xerographic copy of hand-holdable LCD game device and back side of associated packaging-Electronic Baseball.

Xerographic copy of hand-holdable LCD gam device and back side of associated packaging-Double Dragon.

Primary Examiner—William H. Grieb
Assistant Examiner—Jessica J. Harrison
Attorney, Agent, or Firm—Welsh & Katz, Ltd.

[57] ABSTRACT

A novel hand held electronic LCD video game simulating an air battle at sea. Approach of enemy aircraft and aircraft carriers is simulated by sequential display of multiple images. The player manipulates missile sights between nine positions to aim and then fire missiles to destroy the approaching enemy aircraft and carriers. In addition, enemy missile attack is simulated by sequential display of missile images and the player must aim his sights and destroy the missiles before they destroy his aircraft. Five stages of play are provided with increasing speed of play for each subsequent stage. An energy gauge which decreases for each missed enemy aircraft or aircraft carrier limits the number of misses permitted to the player.

1 Claim, 7 Drawing Sheets

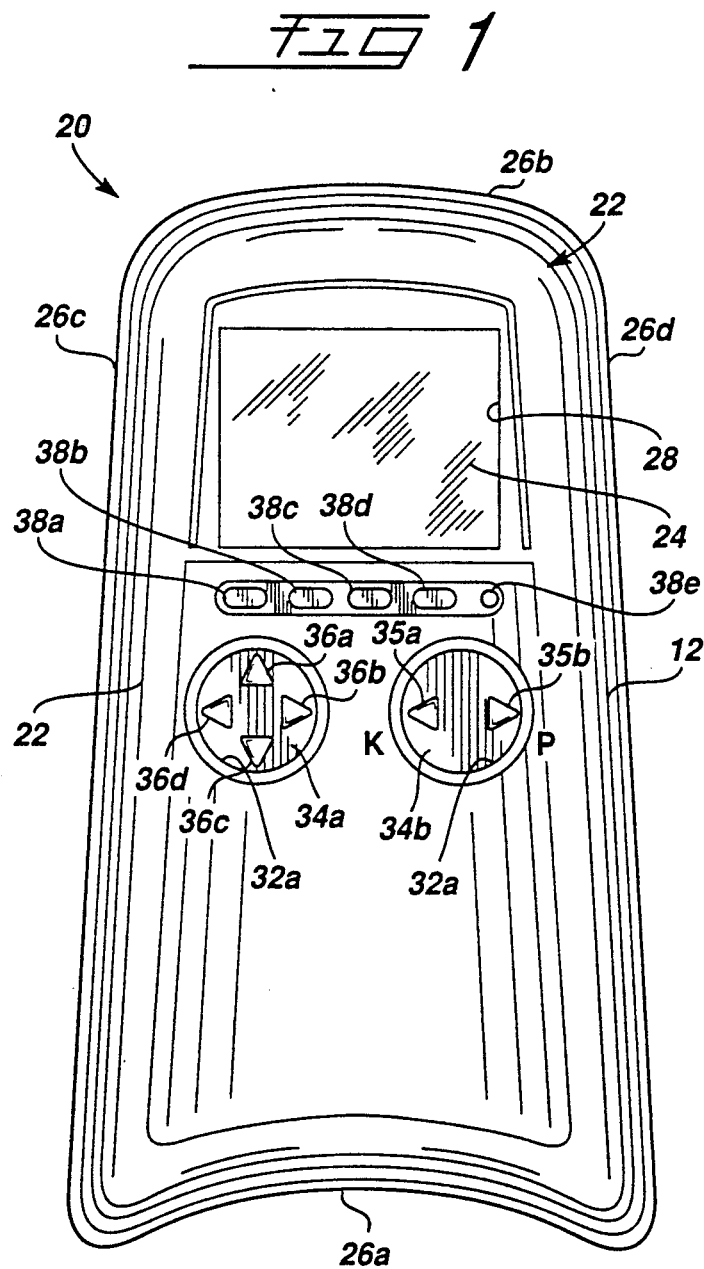

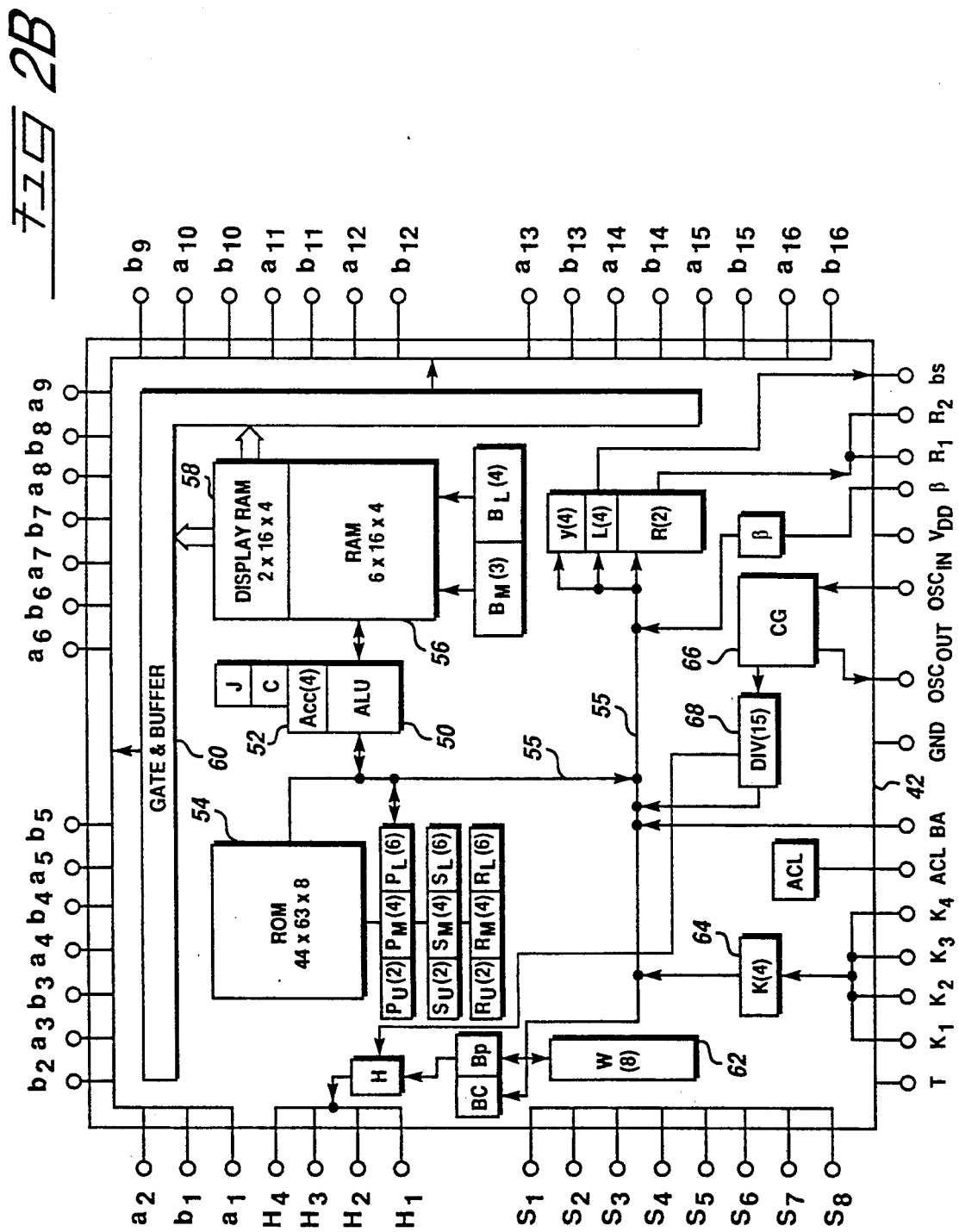

HAND HELD VIDEO GAME WITH SIMULATED AIR BATTLE

The present invention relates generally to the field of electronic games and more particularly to a novel hand held electronic video game.

The advent of video display devices such as liquid crystal displays (LCD) employed in electronic games has led to the development of hand held electronic video games which can be held in the player's hands while allowing the player to manipulate the controls and observe a video display. Such electronic games are know in which a player causes the movement of a games object such as a dart, horseshoe, or ping pong ball. The movement of the game object can be influenced by the player. Some prior art games permit changing of the movement of the game object in a manner unknown to or not easily predictable by a player with reference to predetermined positional relationships between player-controlled and games controlled symbols. Also, games are known in which a game object may be manipulated by a player to try to avoid randomly generated obstacles.

It is accordingly an object of the present invention to provide a novel video game suitable for hand held play using an LCD video display.

It is another object of the invention to provide a figure displaying electronic hand held game apparatus with which a novel game can be played.

It is another object of the invention to provide a novel electronic hand held game apparatus simulating an air battle at sea in which cross hair figures are manipulated by the player to destroy enemy aircraft, missiles and aircraft carriers attacking in a pattern substantially unknown to the player.

Accordingly, in accordance with one embodiment of the invention, there is provided a hand-held image displaying electronic game apparatus including a plurality of manually operable control switches for permitting control of the play of the game by a player, a sound transducer for generating sound, and a control circuit coupled to the control switches and the sound transducer including a processor, a read-only memory, and a random access memory, for generating game control signals and sound signals. Also provided is a display having selectively activatable image segments corresponding to a plurality of player-controlled figures, each defining one of a plurality of regions, game controlled figures, and alpha-numeric game information for selective display thereof. The display is responsive to the game control signals for display of game images such that a player-controlled figure is visually displayed at one of a plurality of pre-determined positions and the position at which the player-controlled figure is displayed is moveable to an adjacent position responsive to player activation of a control switch. In addition, game controlled attack craft image segments are selectively displayed one at a time in a sequence to simulate the approach of an attacking craft in sequentially pseudo-random selected ones of the plurality of regions simulating a sequence of attacks from different regions having a pattern substantially unknown to the player. The control circuit further generates control signals to activate explosion indicating image segments responsive to the player moving the player controlled figure to the region of the displayed attacking craft within a predetermined time of its display together with activation of a firing control switch within the predetermined time. A score is accumulated and continually displayed.

BRIEF DESCRIPTION OF THE DRAWINGS

The invention, together with further objects and advantages thereof, may be understood by reference to the following detailed description taken in conjunction with the accompanying drawings wherein like reference numerals designate like elements throughout several figures.

FIG. 1 is a front elevational view of a housing for a specific embodiment of a hand held electronic LCD video game constructed in accordance with the invention.

FIG. 2B is a detailed block diagram of a specific embodiment of the processor for the hand held LCD video game of FIG. 2A.

DETAILED DESCRIPTION OF THE PREFERRED EMBODIMENT

Figure 2A:
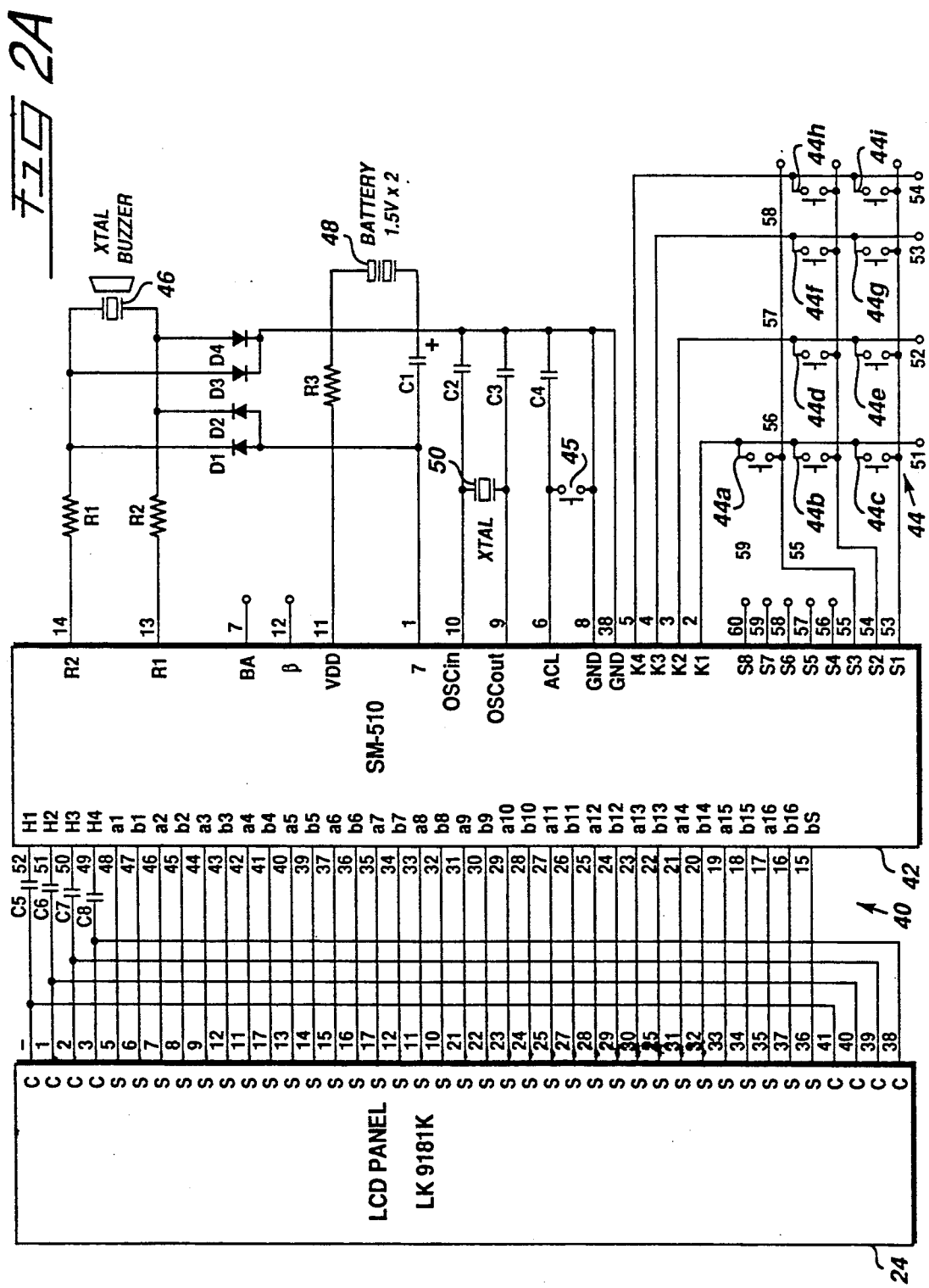
FIG. 2A is a block diagram of the electronics of a specific embodiment of a hand held LCD video game in accordance with the invention.

Referring now to the drawings, FIG. 1 is a front view of a hand held game 20 in accordance with the present invention comprising a casing 22 configured for housing various electronic components and a display 24. The casing 22 has a generally trapezoidal configuration, as shown in FIG. 1, defined by a bottom peripheral edge surface 26a formed as a concave arcuate edge surface, a top edge surface 26b formed as a convex arcuate surface and generally longitudinally rectilinear lateral edge surfaces 26c and 26d. The laterally opposite ends or corners of the bottom and top arcuate edge surfaces 26a and 26b, respectively, blend with the lateral edge surfaces 26c and 26d through rounded corner edge surfaces, as shown. Casing 22 in the illustrated embodiment is approximately 7 inches long, 4½ inches wide at the bottom end, and 3¼ inches wide at the top end. The casing 22 is preferably formed of a suitable rigid plastic material to contain and protect the game electronic circuitry.

The casing 22 has a generally rectangular opening 28 behind which may be mounted the display screen 24 suitably observable in the opening 28. In the illustrated embodiment, the display 24 is a liquid crystal display (LCD) screen, but may alternatively employ another type of display screen suitable for a hand held game such as electroluminescent, electrochromic, etc. The display screen 24, as will be described in greater detail hereinafter, is formed with segments for displaying images for the game, as well as numerical value and other game information displaying portions for displaying game scores and other game-related information.

In addition, various pushbuttons for control of the game, such as control of the visual display of the game images when playing the game, are provided in the vicinity of the display opening 28 of the casing 22. In the illustrated embodiment, the casing 22 has a pair of openings 32a within which may be supported control buttons (keys) 34a and 34b, respectively, forming part of the video display control circuitry. The buttons 34a and 34b may optionally be symmetrically located about the longitudinal center line of the casing 22, as shown. In the illustrated embodiment, the button 34a activates a four-way switch (i.e., four pushbutton switches) with four activation positions indicated by four arrows 36a, 36b, 36c and 36d which may be manually manipulated by the player to control, for example, up, down, right, and left movement (i.e.,. up if the upper arrow 36a is depressed, down if the lower arrow 36b is depressed, right if the right arrow 36b is depressed and left is the left arrow 36d is depressed) of a player-controlled symbol, to be described in detail hereinafter. The button 34b, in the illustrated embodiment, may be manually manipulated by the player to control simulated firing of a player-controlled weapon (i.e., missiles in the illustrated embodiment) on the display screen 24 as will be described in detail hereinafter.

A plurality of generally equal openings to receive pushbutton controls (keys) 38a, 38b, 38c and 38d and a smaller round opening to receive a pushbutton control 38e may also be formed in the casing 22 such that there axis lie along a common line transverse to the longitudinal access of the housing 10, as shown. The pushbuttons 38a, 38b, 38c, 38d, and 38e facilitate selective control of switches which control various aspects of the electronic circuitry of the video game 20.

In the illustrated embodiment, the pushbutton 38a controls an off switch to permit the player to turn the game off and the pushbutton 38d controls an on/start switch which permits the player to turn the game on and to control the start of the game play. The pushbutton 38b controls a sound control switch which allows the player to turn game sounds on and off. In the illustrated embodiment, the pushbutton 38c controls selection of the number of players while the pushbutton 38e controls a reset switch for resetting (clearing) the game after inserting batteries.

FIG. 2a is a block diagram illustrating a specific embodiment of the internal electronic circuitry 40 of the hand-held game 20. The electronic circuitry 40 includes the LCD display screen 24 (e.g., an LH9181K LCD display marketed by Sharp) coupled to a game processor 42 (e.g., an SM-510 marketed by Sharp) as shown. The game processor 42 controls the game display 24 by controlling LCD image segments of the game display 24, and also controls game sound outputs, both responsive to the pushbutton switch control inputs. A set of 10 pushbutton switches 44a–i and 45 is coupled to the game processor to provide control inputs. In the illustrated embodiment, the switches 44a–i and 45 correspond to the control pushbuttons 34a, 34b, 38a–38e of FIG. 1. For example, switches 44a and 44b, 44c and 44d may correspond to pushbutton 34a (i.e., pushbutton arrows 36a, 36b, 36c and 36d), switch 44e may correspond to the pushbutton 34b, switches 44f–44i may correspond to pushbuttons 38a–38d, and switch 45 may correspond to reset pushbutton 38e. A crystal sound transducer 46 is coupled, as shown, to the processor 42 to generate game sounds responsive to sound signals generated by the processor 42. A battery 48, which provides electrical power for the circuitry 40, and an oscillator crystal 50 for use in generating clock signals in conjunction with associated capacitors is also coupled, as shown, to the processor 42.

Referring now to FIG. 2B, there is shown a detailed block diagram of a specific embodiment of the game processor 42 with pin designations corresponding to those shown in FIG. 2A. The processor 42 comprises an arithmetic logic unit (ALU) 50 and associated registers 52 coupled along with a read only memory (ROM) 54 to a central bus 55. A random access memory (RAM) 56 including a display RAM 58 is coupled directly to the ALU 50 and to a gate and buffer circuit 60, as shown. The gate and buffer circuit couples display segment control signals to the segment control outputs $a_1$–$a_{16}$ and $b_1$–$b_{16}$, as shown. The control switch inputs $S_1$–$S_6$ and $K_1$–$K_4$ are coupled respectively through interface buffers 62, 64 to the ALU 50 through the bus 55. In addition, a clock signal circuit 66 couples clock signals to the bus 55 through a divider 68.

The processor 42 generates image segment control signals and sound signals by processing the control switch inputs responsive to a game program stored in the ROM 54 utilizing the RAM 56 for temporary storage. The ROM 54 stores the game program and stores the data needed for controlling the image segments of the display 24. The display RAM stores the current image segment control data, which is coupled to the display to control the game images.

Figure 3:
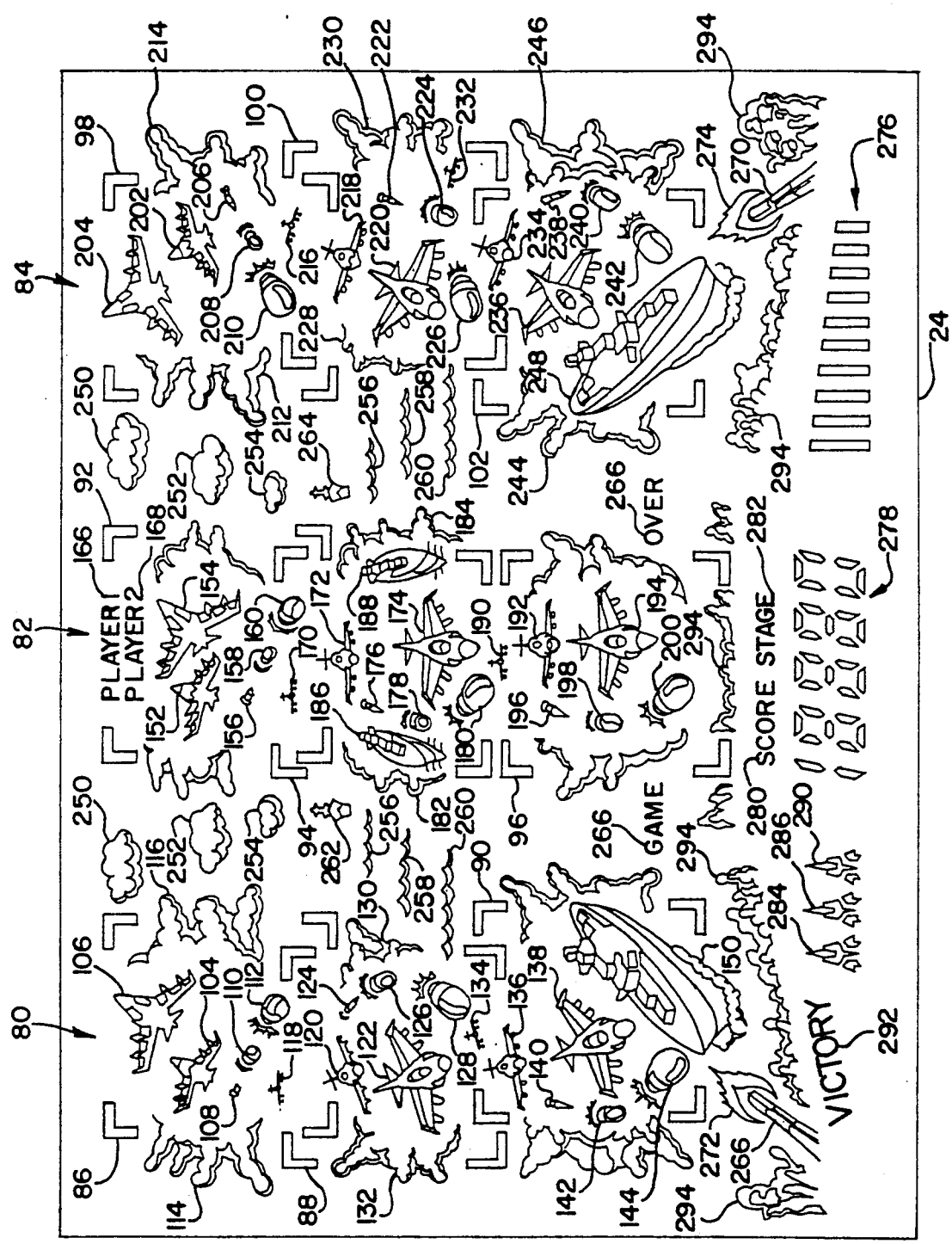
FIG. 3 is a diagrammatic view illustrating a specific embodiment of a detailed pattern for a display of the embodiment of FIG. 1.

FIG. 3 is an illustration of a specific embodiment of a display pattern made up of selectively activatable images or image segments for the display 24, each of which when activated become visually displayed. The game displayed by the image display screen 24 of the illustrated embodiment is a game in which an image of a player-controlled symbol, missile sighting cross hair, is manipulated to aim a missile in the players aircraft, and in which firing of the player's missiles is manipulated to destroy on-coming enemy aircraft and aircraft carriers and their missiles. The player must progress through five stages avoiding the attacks of the missiles of the enemy aircraft and carriers in order to destroy all of the enemy aircraft carriers. The game may be played by one player or two players and has five stages of play.

The display 24 comprises selectively activatable figures (i.e., image segments), including three vertical columns 80, 82, 84 of player and game-controlled image segments extending from the top of the display 24. Each of these columns 80–84 comprises three player-controlled cross hair image segments 86–102 arranged vertically, as shown. Each cross hair image segment comprises a set of four associated right angle segments configured to form the corners of a rectangle, as shown. Generally within each cross hair rectangle are located a number of game-controlled image segments primarily of enemy aircraft, missiles and carriers.

Referring to the leftmost column 80, located within cross hair 86 are image segments of two enemy aircrafts 104, 106; of three enemy missiles 108, 110, 112; and explosion indicating image segments 114, 116. In cross hairs 88 are located three enemy aircraft images 118, 120, 122; three enemy missile images 124, 126, 128; and explosion indicating image segments 130, 132, as shown. The enemy carrier, aircraft and missile image segments are arranged in sets of two or three images of increasing size, as shown, to simulate varying distance to the carrier, aircraft or missile. The cross hair 90 contains image segments of three enemy aircraft 134, 136, 138; three missile image segments 140, 142, 144; explosion indicating image segments 146, 148; and a large aircraft carrier image segment 150, as shown.

In the middle column 82, the cross hair 92 encloses image segments of two enemy aircraft 152, 154; three enemy missile image segments 156, 158, 160; and explosion indicating image segments 162, 164. In addition, alpha-numeric image segments 166, 168 are located at the top of the cross hair 92, as shown. In the cross hair 94 are located three enemy aircraft image segments 170, 172, 174; three enemy missiles 176, 178, 180; explosion indicating image segments 182, 184; and two mid-sized enemy carrier images 186, 188. The cross hair 96 contains three enemy aircraft image segments 190, 192, 194; three enemy missile image segments 196, 198, 200; and explosion indicating segments 202, 204, as shown.

The right column of image segment 84 includes the cross hairs 98, 100, and 102. The cross hair 98 encloses two enemy aircraft image segments 202, 204; three enemy missile image segments 206, 208, 210 and explosion indicating image segments 212, 214. The cross hair 100 contains three enemy aircraft image segments 216, 218, 220; three enemy missile image segments 222, 224, 226; and explosion indicating segments 228, 230. Associated with the cross hair 102 are three enemy aircraft image segments 232, 234, 236; three enemy missile image segments 238, 240, 242; explosion indicating image segments 244, 246; and a large enemy aircraft carrier image segment 248, as shown.

Between the three columns of image segments 80, 82, 84 are three pairs of cloud image segments 250, 252, 254 of differing size; three pairs of wave image segments 256, 258, 260 of differing size; two small sized enemy aircraft carrier image segments 262, 264; and an alpha-numeric image segment 266 of "GAME OVER", as shown. At the bottom of the display 24 is the player cockpit section which includes missile launcher image segments 268, 270; missile firing indicating image segments 272, 274; and energy gauge image segment 276 and a five character alpha-numeric image segment 278 with associated "SCORE" segment 280 and "STAGE" segment 282 for displaying the game score and stage of play. In addition, a set of three remaining player aircraft indicating segments 284, 286, 290 are shown along with a "VICTORY" image segment 292 and explosions indicating segment 294 for indicating explosion of the player aircraft.

During play of the game, only one of the player-controlled cross hairs 86-102 is visually displayed at any time. The player may move the displayed player-controlled cross hair by activating the left control pushbutton 34a. Thus, by pushing on the button position 36a, the player-controlled cross hair directly above the previously displayed cross hair is displayed, simulating upward movement, while pushing on the pushbutton region 36c causes simulated movement downward on the display 24. Similarly, left or right movement is activated by pushing the left arrow 36d or the right arrow 36b of the control pushbutton 34a. Activation of the control pushbutton 34b momentarily visually displays the missile firing segments 272, 274, thereby simulating firing of a missile of the player-controlled aircraft. Thus, the player-controlled aircraft may be manipulated by moving the cross hairs 86-102 to any one of nine positions 86-102 and by firing missiles, using pushbuttons 34a and 34b, respectively.

Simulated movement of the enemy aircraft, missile, and aircraft carriers is provided under control of the game electronic processor 42 by visual display of one image at a time in a sequence. Thus, an enemy aircraft is caused to appear to advance on the display 24 (i.e., generally toward the player-controlled image) by sequentially displaying in three steps (i.e., scrolling) images from the smaller image segment to the larger image segment of a set of aircraft image segments within a cross hair region. Thus, for example, aircraft image segments 118, 120, 122 would be displayed sequentially in three steps, first image segment 118, then image segment 120, then image segment 122 to simulate the approach of the enemy aircraft. This sequence is followed for a set of aircraft image within a cross hair region to simulate the approach of an enemy aircraft within that region. The same scrolling of the three image segments of increasing size within a given cross hair region is used to simulate approach of missiles within that cross hair region (e.g., within cross hair 94, missile image 176, followed by image 178, followed by image 180 would be displayed). Aircraft carrier approach similarly is simulated by a sequential display of the carrier image segments 262, then 186 and then 150, or image segment 264, followed by image segment 188 and then image segment 248. In the illustrated embodiment, for enemy aircraft, missiles or carriers, each image segment is displayed 1.2 seconds for the first stage of play, 1.0 second for the second stage, 0.8 second for the third stage, 0.7 second for the fourth stage and 0.6 second for the fifth stage. The largest enemy missile image is displayed in all stages for 1.2 seconds and if it is not destroyed by the player within that time, the missile destroys the player's aircraft. Destruction of the player's aircraft is simulated by blinking display of the explosion segment 294, generation of explosion sounds and disappearance of one of the remaining aircraft image segments 284, 286, 290.

The player can destroy enemy aircraft, missiles, and carriers by first moving displayed cross hair, such that the displayed enemy image segment is within the displayed cross hair. Cross hairs can be moved every 0.2 second by pressing the desired arrow on the direction control pushbutton 34a, but may only be moved vertically or horizontally and not obliquely. When the enemy image is within the cross hair, the cross hair will blink for 0.2 second and if the player fires a missile while the cross hair is sighted on the enemy image, the enemy will be destroyed by the missile. However, the cross hair will not blink and enemy aircraft, missiles and carrier cannot be destroyed if fired upon when the smallest of the three images is displayed (i.e., they are too far away). The player may launch a missile by pushing the fire pushbutton 34b which will cause the firing image segments 272, 274 on the launchers 266, 270 to blink for 0.3 second along with a generation of missile roar sound. A missile does not appear on the display, but if fired in time to destroy the enemy target, the associated explosion image segment will be displayed, along with the explosion sound generation, and the player's score will be increased. If the player fails to destroy an enemy aircraft or carrier during the time it is displayed, the player looses energy on the energy gauge 276. Thus, the energy gauge 276 is reduced by one bar if the player fails to destroy an enemy aircraft and two bars if the player fails to destroy a carrier. The player starts with ten bars on the gauge.

A depth and motion effect for the player's simulated position is created by sequential display of the cloud segment pairs 250, 252, 254 and the wave segment pairs 256, 258, 260. Thus, the sequence of display in the illustrated embodiment is cloud segment pair 254 and wave segment pair 256, followed by cloud segment pair 252 and wave segment pair 258, followed by cloud segment pair 250 and wave segment pair 260. This sequence is performed using a time between change of image segment pairs of 1.5 seconds in stage one play, 1.3 seconds in stage two play, 1.1 seconds in stage three play, 1.0 second in stage four play and 0.9 second in stage five play.

During play of the game, a player is allocated three aircraft indicated by display of all three remaining aircraft image segments 284, 286, 290. If an enemy missile is not destroyed in time by the player, one aircraft is lost resulting in one of the remaining aircraft image segments being turned off. One aircraft will also be lost if the player energy gauge disappears (i.e., after loss of ten bars). If all three aircraft are lost, the game is over.

The game starts with ten bars blinking onto the display of the gauge 276. One bar vanishes for each enemy aircraft that escapes undestroyed, two bars vanish for each enemy carrier that escapes undestroyed, and one bar vanishes for each 20 second time period that passes. When all ten bars have vanished from the gauge 276, a player aircraft is lost resulting in one of the remaining aircraft image segments 284, 286, 290 vanishing from the display. Then gauge will then start again with ten bars for the next player aircraft. After clearing one stage and progressing to the next, the gauge resets to ten bars.

There are five stages of play with 90 seconds for the first stage, 90 seconds for the second stage, 100 seconds for the third stage, 110 seconds for the fourth stage and 120 seconds for the fifth stage. When the time of a stage ends, no enemies appear for a brief period, clouds and waves blink and music plays. The energy gauge then resets to ten bars and the next stage begins. When the last stage is cleared, the "VICTORY" image 292 is blinked on and off the display, victory sound is generated and the score is blinked. If all three player aircraft are lost before clearing stage fire, the "GAME OVER" image segment 266 is displayed with generation of sounds. However, if a player is in stage five when last player aircraft is lost, the "VICTORY" image segment 292 will also be displayed. If two players are playing the game, the appropriate image segment "PLAYER 1" 166 or "PLAYER 2" 168 will be displayed along with the "VICTORY" segment 292 or "GAME OVER" segment 266.

The player score is displayed continuously throughout game play on the numeric display segment 278. The player accumulates ten points for destroying an enemy aircraft, thirty points for destroying an enemy aircraft carrier, and one hundred points for destroying an enemy missile. In addition, at the end of a stage, fifty points are added for each energy gauge bar remaining. If all five stages are cleared, five hundred bonus points are added and one hundred points are added for each remaining player aircraft.

Figure 4A:
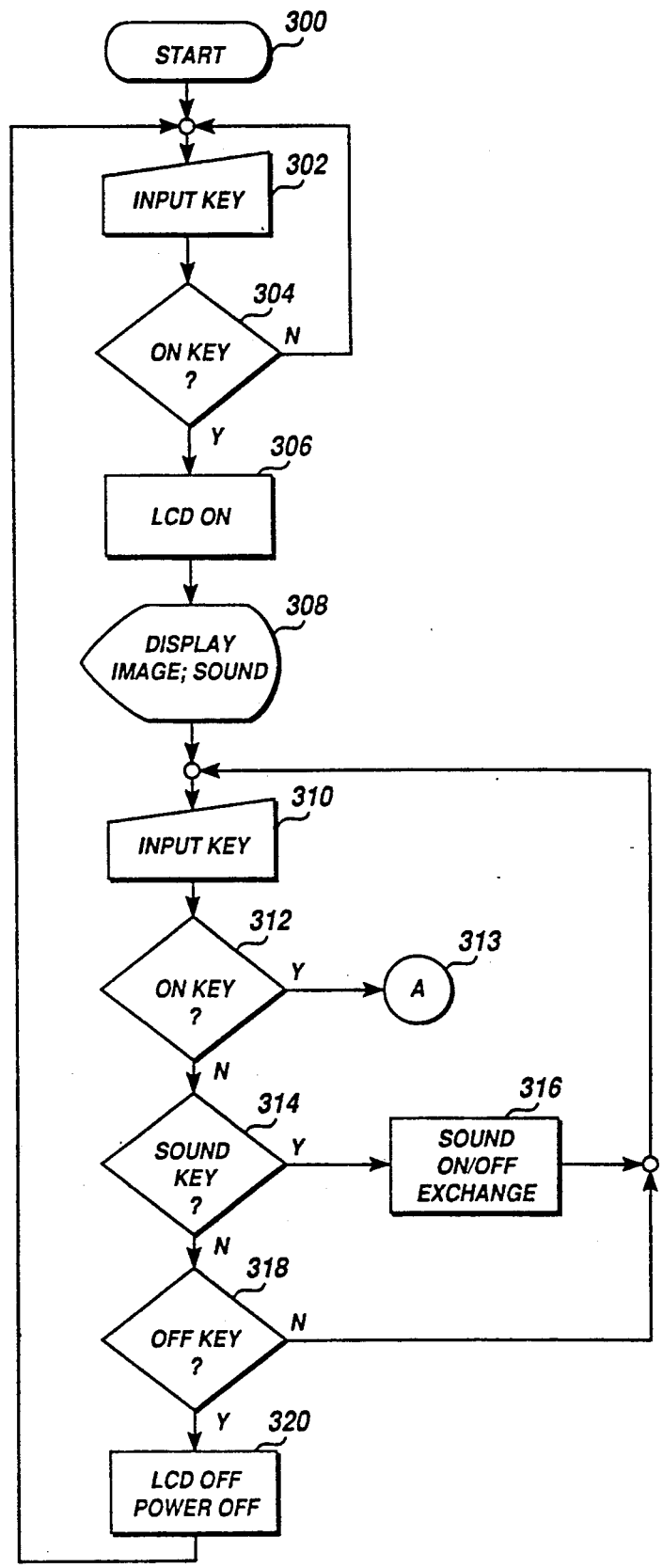
FIG. 4A–4C are flow diagrams illustrating the game control sequence and game play methodology of a specific embodiment of a control program for the game processor 42 according to the invention.

The game is initiated, as shown by blocks 300, 302 and 304 of FIG. 4A, by pushing the power on pushbutton (i.e., key) 38d which activates the display 24 to display the "PLAYER 1" segment 166, and will generate a game sound sequence, as shown at blocks 306 and 308. Game play is begun, as shown at blocks 310 and 312, by pushing the on/start key 38d a second time. This results in branching to the routine of FIG. 4B as illustrated at branch point 312. If the game play is not initiated at block 312 by activating the on key, program control continues to the decision block 314. As illustrated by blocks 314 and 316, the sound may be deactivated so that the game is silent by depressing the sound on/off key 38b or can be reactivated by depressing the sound on/off key 38b again. As illustrated at blocks 318 and 320, the game may be turned off at any time by depressing the power off key 38a where upon the game sequence returns to block 302 to the restart of the game, as shown.

Figure 4B:
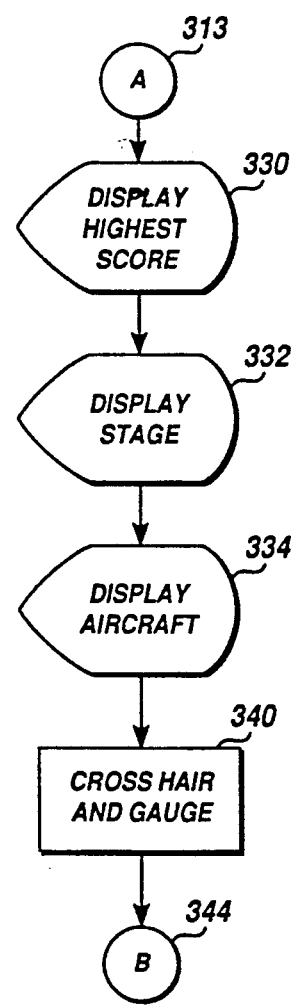

A second depression of the power on key 38d, as illustrated at block 312, will result in branching to FIG. 4B, as shown at block 313. As illustrated at block 330 of FIG. 4B, the second depression of the on key activates the display of the previous highest score for several seconds (e.g., two seconds) on the digital numeric segment 278 along with a sound sequence, as shown at block 230. This is followed by display of the "STAGE" image segment 282 and a digital one to five on the digital numeric segment 278 indicating the stage of play that the player is in (i.e., the first stage, second stage, etc.) for several seconds (e.g., two seconds) along with a beep, as illustrated at block 232. This is followed by display of the three remaining player aircraft 284, 286, 290, along with a beep, indicating the number of remaining operator-controlled aircraft (e.g., three in the illustrated embodiment) allocated for the game, as illustrated at block 234. Each game begins with an allocation of three player-controlled aircraft. If all three aircraft are destroyed, the game is over.

A cross hair (e.g., cross hair 86) then appears and ten bars on the energy gauge 276 blink onto the display and the clouds and waves begin to scroll indicating the beginning of play as indicated by block 340. The enemy attack begins by scrolling (i.e., simulated movement by sequentially displaying images) forward from smaller to larger images of enemy images on the display 24.

Figure 4C:
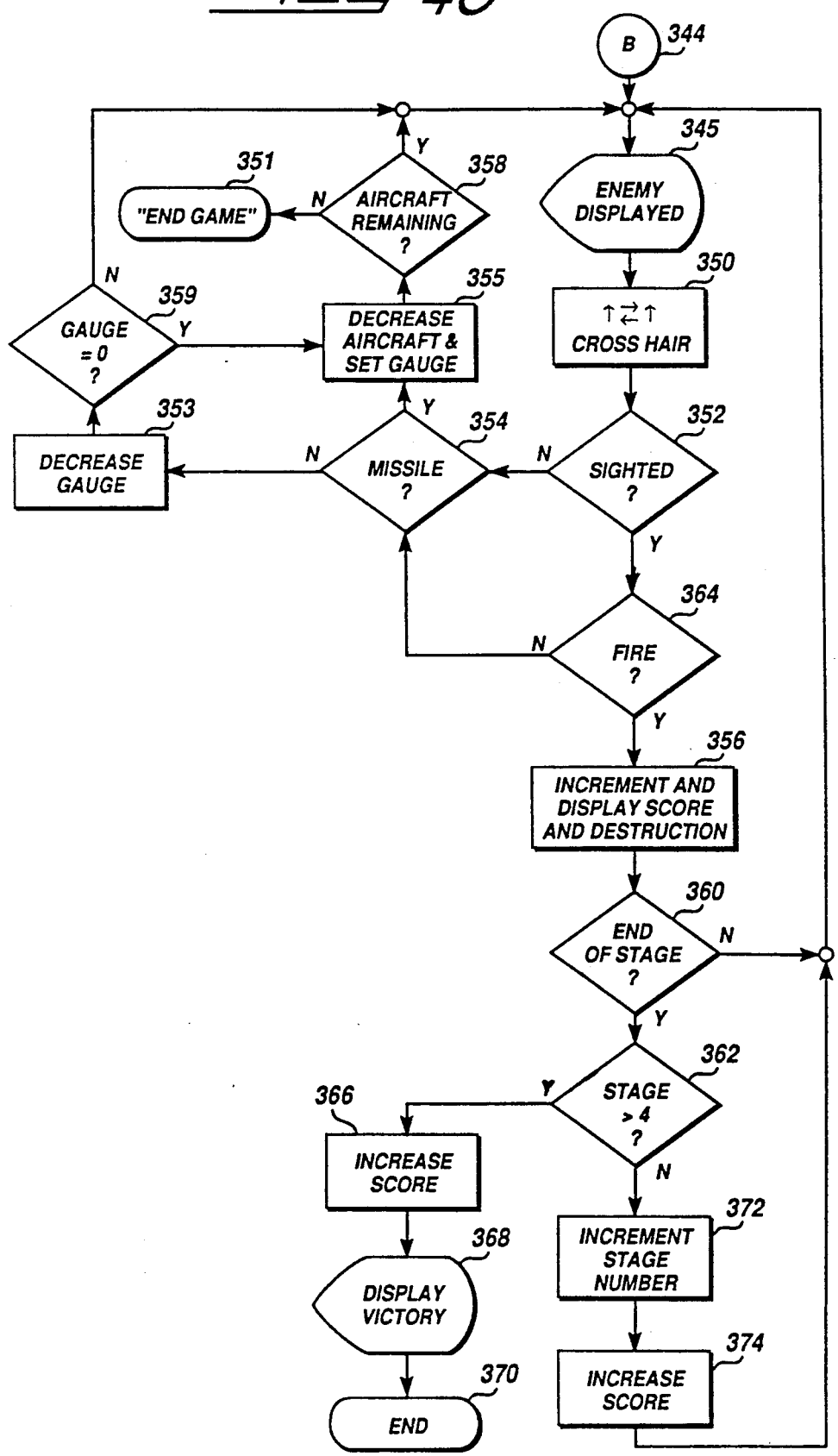

As illustrated, game play proceeds from branch point 344 to blocks 348 and 350 of FIG. 4c, where the sequential image segments of an attacking enemy missile, aircraft or carrier is displayed, as indicated by block 247. These images may appear at any of the nine cross hair regions and may be any of the three types of enemy images. The images location and type is generated in a psuedo-random pattern (i.e., a pattern substantially known to the player) to avoid a pattern recognizable by the player. This may be done using several stored sets of patterns which are combined in various permutations or by use of a random number generator. The player may manipulate the controls 34a to sight the cross hairs on appearing enemy images by pushing the up, down, right or left arrow of key 34a, as indicated by blocks 348 and 350. If the cross hair is sighted onto the enemy image when it can be destroyed, the cross hairs will blink and the player can destroy the enemy image by pushing the fire pushbutton, as indicated by blocks 352, 354. If the enemy image is not successfully sighted by the player cross hairs and escapes, then if it is an aircraft or carrier, the energy gauge 276 is decreased, as indicated by blocks 354 and 353. If the energy gauge is reduced to no remaining energy bars, then the remaining player aircraft is reduced by one and the gauge is reset as indicated by blocks 359 and 355. If the enemy craft that escaped destruction was a missile, the remaining player aircraft symbol is decreased by one, the energy gauge is reset and if aircraft remain, the player continues, as illustrated by blocks 354, 355 and 356. If no aircraft remains, the game is over, and "GAME OVER" is displayed as illustrated by blocks 357. As illustrated by blocks 364 and 356, if the enemy craft is destroyed by a missile fired by the player, the player's score is increased accordingly and if the player fails to fire in the required time, the game sequence branches to block 354, as shown. The score is continually displayed during the game play and when an enemy craft is destroyed, an explosion image is temporarily displayed and the destroyed symbol is removed, as indicated by block 356.

After the player fails to destroy an approaching enemy craft, play will either continue with approach of another enemy craft or the end of the stage will be reached as illustrated by block 360. If the stage has ended, a new stage will begin with the increase of the stage number and increase of the score as previously described followed by continuation of play of the game, as illustrated by blocks 362, 372 and 374. If the end of the fifth stage has been reached, the score will be increased as previously described, the VICTORY image will be displayed and the game is ended as illustrated by blocks 362, 366, 368 and 370.

The game may also be played by two players by selecting a two player mode after the first power on step. This selection is performed by the player selection pushbutton 38c after which "PLAYER 2" is displayed. The on/start key 38d is then pressed to start the game as indicated by block 312 of FIG. 4A and "PLAYER 1" is displayed after the highest previous score is displayed for several seconds. The normal game sequence then begins as shown at node 332 of FIG. 4B until player one has lost one player aircraft. The next player then depresses the on key to start the sequence for the next player beginning at node 332 until the second player looses a player aircraft. This sequence continues until the game is over.

A specific program listing for use with the illustrated embodiment in which the SM-510 processor is used is shown in Appendix A. The program shown is a hexadecimal object code listing having a hexadecimal program address on the left followed by a hexadecimal representation of the object code. The program includes both image segment control and sound generation code.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Specific embodiments of the novel electronic handheld video game according to the invention have been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all underlying modifications, variations or equivalents that fall within the true scope of the basic underlying principles disclosed and claimed herein.

Appendix A

```
  1 *------------------------------------------------------
  2 *              BH003    Top_Gun
  3 *                       prog & music
  4 *                       ROM addr 0000H thru 0FFFH
  5 *                                       By  KONAMI
  6 *------------------------------------------------------
  7 * addr  0  1  2  3  4  5  6  7  8  9  A  B  C  D  E  F
  8 *------------------------------------------------------
  9 <0000> 5F 00 7C 5F 88 72 84 36 29 53 F3 73 40 53 74 53
 10 <0010> 72 9C 28 01 53 72 92 7A 9B 5F 24 27 23 A3 22 21
 11 <0020> 36 40 73 26 53 80 71 9F 94 2A 85 74 74 53 53 53
 12 <0030> 20 53 A9 73 25 37 26 9E 93 FE 53 72 9F C0 6E 00
 13 <0040> 56 00 00 55 02 00 A9 60 10 5F 00 6E 21 25 67 6A
 14 <0050> 05 5F 00 6C 02 A6 54 02 8A A9 83 5F 89 6E 6E 0E
 15 <0060> 88 B1 10 50 70 74 10 5A 76 5F 20 10 28 08 5F 54
 16 <0070> 6E 57 53 AE 11 54 A6 6F 55 20 56 04 AF 00 05 00
 17 <0080> 5F 78 73 75 5A 5F 00 00 7C 7C 7C 21 22 79 7C 39
 18 <0090> 5F C0 00 00 9C C0 78 83 70 78 6E E1 6E 10 5F 9F
 19 <00A0> 34 80 70 7C 58 7E 7E 6F 36 7C 70 20 C0 7F 57 5F
 20 <00B0> 05 C1 7F 5F 20 10 7C 78 5F 09 10 58 3E B3 57 00
 21 <00C0> 20 00 6E 7F 6F 10 10 7F 18 A2 0E 08 18 20 10 38
 22 <00D0> 7C 06 58 85 20 71 6E 8A 38 1C 8A 6C 7F 31 7F 29
 23 <00E0> 14 78 5F 78 34 9E 31 7F 40 14 10 7F 10 8B 00 9E
 24 <00F0> 29 7E 85 20 B1 00 0B 22 53 8A 18 9E 6E 20 6F 00
 25 <0100> 7F 00 66 85 55 72 6A 83 60 6E 05 5F 92 5F 78 5F
 26 <0110> 84 5F 0F 40 85 7E 84 5F 1C 7A 6E 40 55 5F 9C 61
 27 <0120> 61 54 B2 5F 92 79 5F 79 8F 54 5F 79 6E 54 80 6E
 28 <0130> 00 79 5F 00 55 0E 5F 5F 64 6F A3 40 80 54 20 00
 29 <0140> 06 00 00 53 25 1F 20 E3 75 88 77 24 21 37 75 20
 30 <0150> 77 B2 84 74 5F 26 88 20 A6 0F 5F 53 20 A3 1C 11
 31 <0160> 5F 84 53 22 C0 53 94 10 10 F3 37 75 88 8B 14 20
 32 <0170> 63 55 5F 5F 21 92 23 1F 06 36 53 BE 6C 5F 20 00
 33 <0180> 7A 6E 10 7C 20 21 91 60 10 02 82 11 21 7F 66 7F
 34 <0190> 77 5F 5F 5F 54 20 71 70 09 7E 88 57 58 AC 8D 8C
 35 <01A0> 97 C0 82 29 20 07 10 91 C0 08 85 EA 5F A5 80 65
 36 <01B0> 0F 71 55 5F 10 7A 10 5F 7F 69 54 3E 91 57 69 00
 37 <01C0> 10 00 02 75 AD 7A 90 06 7E 7C 89 56 74 53 99 B3
```

```
38 <01D0> 74 1F 06 AD 55 05 66 08 7F 5F 7A AD AB 56 53 53
39 <01E0> 5F 0E 7F 7F 10 94 56 02 F3 87 85 29 10 5F 75 BD
40 <01F0> 62 30 85 28 5F 53 7C 25 07 53 65 08 2A 27 06 00
41 <0200> 5F 00 77 53 24 74 22 77 5F 02 2B 7A 73 02 5F 7D
42 <0210> 5F 85 5F 95 79 79 00 00 88 5F 5F 7C 6C 9B 77 73
43 <0220> 02 92 53 7C 00 07 56 00 73 06 0F 00 5F F2 7D 7D
44 <0230> 21 F2 0F 88 7C AA AC 00 53 5F F2 88 9A 5F 5F 00
45 <0240> 58 6E 77 AD 82 5F A8 84 D7 7C 10 7D 7D 57 7D
46 <0250> B2 7A A2 6C 56 22 04 91 77 24 05 54 82 00 6E 6F
47 <0260> 6E 7C 0C 07 55 A8 5F A3 00 6E 6F 55 78 BA 0F 22
48 <0270> 80 5F 5F AF 97 9B 26 10 5F 7C 5F 5F 17 77 54 00
49 <0280> 5F 54 76 34 76 A5 77 70 6C 91 77 75 87 A1 7A 1B
50 <0290> BA 5F 54 AA BB 82 92 0F 56 76 56 37 5F A3 7D 5F
51 <02A0> 63 59 80 5F 56 78 55 5F 74 77 54 5F AD 55 7B 02
52 <02B0> 24 77 AA 76 80 23 74 28 10 0F 54 53 79 82 00 00
53 <02C0> 5F 27 7A 10 1C B1 9D 57 56 77 82 82 69 53 75 6B
54 <02D0> 18 37 10 94 5F 56 53 67 31 5F 70 10 AB 5F 0C 31
55 <02E0> 5F 6C 5F A2 99 20 56 74 3F B1 6B 5F 1R 2E 76 30
56 <02F0> 54 5F B1 62 30 5E 31 10 90 80 10 5F 6C 61 18 00
57 <0300> 0C 00 00 06 00 00 0F 0F 00 00 00 00 00 7D 06 69
58 <0310> A3 00 00 00 00 00 00 0E 55 00 5F 0F 5F A3 88 6A
59 <0320> 5F 7B 00 5F 00 00 00 80 5F 00 00 19 6E 6E 7C 88
60 <0330> AC 6E 00 69 70 06 05 6A 0C 7D 56 88 6A 6A 88 00
61 <0340> 5F 00 7A 69 7C 00 8H 8H 7A 3F 6D 6H 69 04 0F B3
62 <0350> 9B 5F 5F 82 37 5F 7E 56 BD 02 3F 8B 57 6A 54 10
63 <0360> 13 03 40 6A 55 04 3A 8H 69 6A 82 83 6A 74 AA 69
64 <0370> 23 30 8C 5F 3A 5F 97 C0 53 00 BB 5F AD 3F 20 00
65 <0380> 63 00 C0 5F 6A 7A 80 96 5C AA DD 5F F6 53 56 23
66 <0390> 20 6B 53 3C 04 91 1A 53 B6 77 24 30 83 07 87 40
67 <03A0> 5B 11 5C 24 6B 0F 69 22 10 6B 5F 9A 96 10 23 5F
68 <03B0> BE 53 5C 53 5F 83 3C 0F 7B AE 5C 71 B2 53 69 00
69 <03C0> 5F 00 00 AB 5F 00 A1 54 B2 AB 00 76 54 56 67 56
70 <03D0> 63 54 84 AB 00 00 5F 6F 5F 7A 66 97 7A 5F 78 6A
71 <03E0> 6B 5F 7B 9A AB 54 69 00 00 6E 69 AB 55 57
72 <03F0> 57 AB 5F AB 90 5F 55 80 BE 5F AB AB AB 5F 5F 00
73 <0400> 58 00 A4 C0 20 6C 73 5F 14 6E 5F 6E 73 6E 6E 5A
74 <0410> 78 20 0B 10 77 10 38 56 5F 5F 3C A5 5F 0F 00 11
75 <0420> D0 5F 14 07 72 5F 20 6C 56 5F 20 0A 7B 5F 70 10
76 <0430> 5D 6E 2B 32 87 5F 56 5F 77 6E 5F 1A C0 0B 5F 00
77 <0440> 79 00 B4 B4 88 1C 57 0F 24 56 20 B9 A7 1D 10 90
78 <0450> 71 A4 A2 0F 74 0A 55 6A 10 10 5F 23 AA 5F 5A 62
79 <0460> 14 07 22 5F 5F 21 71 62 11 76 5F 5A 54 A4 62 62
80 <0470> 7A 02 02 6A 72 A9 94 A2 FB 5A 2B 63 5F 6A 02 00
81 <0480> 5F 83 72 5A 3A 96 6F 0F 55 7D 65 8B B3 0C 53
82 <0490> 5F 74 6E 95 6E 5F 5F A3 82 65 54 54 2D 74 2C 9E
83 <04A0> 78 BA 5F 2E 6E 00 55 9C 74 5F 88 5F 5F B9 53 5F
84 <04B0> 78 53 5F 72 A5 40 40 40 C0 96 5F 73 2B 87 53 00
85 <04C0> 5F 00 00 5F 00 77 A8 66 54 88 9B 5F A9 54 35 34
86 <04D0> AE A9 55 70 00 20 19 BA AA 71 90 0B 62 5F 5F 80
87 <04E0> 20 61 72 18 A6 34 5F 55 5F 77 5F 10 5F 64 57 5F
88 <04F0> 88 09 5F 30 60 0F 30 30 A6 5F 10 08 18 12 09 00
89 <0500> 5F 30 76 70 70 77 70 05 40 7D 5F 54 C0 06 6B 23
90 <0510> 70 70 04 C7 69 8A 00 5F 9B 7A 90 00 00 55 02 7A
91 <0520> 02 B4 A4 7D 0C 99 7A 53 40 7C 7C 77 7D 7A 0F C7
92 <0530> 29 20 AD 5F 0E 56 40 7D 53 5F AD 6A 6E 5F 6F 00
93 <0540> 0F 00 DC 79 1F 76 5F 7A 8F 7F 44 54 93 BD 5F 7E
94 <0550> 0E 32 04 27 5F 7C 69 06 04 54 3D A2 93 00 37 AC
95 <0560> 72 54 5F 54 5F A4 92 34 04 05 36 05 7F 5F 55 04
96 <0570> 10 AD 6A 7C 7F 7F 37 7F 5F 97 30 37 70 5F 54 00
97 <0580> 7C 52 77 80 7D 02 56 5F 5F 11 74 8A 5F 78 FD 10
98 <0590> D0 0C 5F 7D 02 40 69 5F 5F D8 5F 7E 67 7C 1B 10
99 <05A0> DB 7C 80 61 13 65 14 7C 5F 80 77 6B 63 10 0F 7C
100 <05B0> 0F 5F 7C C0 0F 0C 08 69 0F 0A 5F 2C 0A 5F 2C 00
101 <05C0> 5F 00 00 53 5F 7E 1C 8B 08 80 79 07 5F 0B 56 14
102 <05D0> 0F 21 79 21 10 BA 92 92 7C BA 21 36 05 D2 37 5F
103 <05E0> 16 BA 10 06 10 0C 1A 92 79 08 5A 5F 7E 10 0E 14
104 <05F0> 54 0F 5A 55 C3 1C 5F 7C B3 AC 74 6F 04 5F 00 00
105 <0600> 5F 00 64 11 28 7A 2A 67 0E 67 04 53 11 6B 5F 29
106 <0610> 06 0C 5F 0E 55 76 28 10 5F 28 5F 10 67 96 17 20
107 <0620> 0B 04 10 7D 5F AA 0C 53 A9 7A 5F 04 6A A9 2A 61
108 <0630> 54 10 6B B4 2A 06 20 64 BD 5F 53 BC 2F 5F 61 00
```

| | | | | | | | | | | | | | | |
|---|---|---|---|---|---|---|---|---|---|---|---|---|---|---|
| 109 | <0640> | 5F | 00 | 6B | B9 | 5F | 77 | A1 | 63 | A6 | 05 | 8C | 05 | E3 | 55 | 5F | B9 |
| 110 | <0650> | B4 | 55 | 06 | 53 | 20 | 7A | B4 | 56 | 07 | 75 | B4 | 9B | 5F | 98 | A7 | 6F |
| 111 | <0660> | 6F | 54 | 30 | 57 | 21 | 75 | 21 | 56 | AD | 85 | 10 | 8D | 84 | 04 | 7F | 54 |
| 112 | <0670> | 07 | B6 | 10 | 9C | 57 | 06 | 54 | BD | 70 | 85 | BE | AD | A9 | 55 | 5F | 00 |
| 113 | <0680> | 0F | 00 | 78 | 7C | 91 | 07 | 10 | 1F | 02 | 57 | 13 | AB | 04 | 7E | 7F | 34 |
| 114 | <0690> | 5F | 7A | 64 | 20 | 13 | 5F | A5 | 90 | 7C | 78 | 30 | 66 | 74 | 07 | 7E | 07 |
| 115 | <06A0> | 6E | B3 | 9D | 7E | 06 | 5F | 06 | 7C | 75 | 5F | 10 | 07 | B3 | 57 | 57 | 7F |
| 116 | <06B0> | 5F | 10 | B3 | 7F | 5F | 37 | 73 | 5F | B6 | 5F | 57 | 37 | B9 | 00 |
| 117 | <06C0> | 5F | 00 | 00 | 5F | 00 | 00 | 0F | 5F | 00 | 00 | 00 | 90 | 00 | 19 | 03 | A5 |
| 118 | <06D0> | 55 | 00 | 40 | 00 | 00 | 00 | 0F | A3 | 26 | 00 | 7E | 7D | 0E | AB | 54 | 8D |
| 119 | <06E0> | 73 | 6E | 00 | 63 | 00 | 7A | 00 | 6B | B6 | 00 | 00 | 04 | 67 | 06 | 5F | 19 |
| 120 | <06F0> | 54 | 07 | 00 | F0 | 05 | 74 | 5F | 79 | BD | 83 | 0F | 55 | 04 | 19 | 56 | 00 |
| 121 | <0700> | 54 | 00 | 40 | 5F | 94 | 75 | 06 | 68 | 85 | 56 | BF | 8F | 5F | 6B | 05 | 74 |
| 122 | <0710> | 0E | 30 | 74 | 0E | 5F | 04 | 0E | 68 | 5F | 06 | 5F | 5F | 56 | 56 | 06 | 68 |
| 123 | <0720> | BF | 6A | 68 | 10 | 5F | 5F | 66 | 7E | BF | 8F | 3F | 10 | 66 | 68 | B4 | 0B |
| 124 | <0730> | 5F | 85 | 5F | 5F | 35 | 06 | 65 | B4 | 66 | 5F | 56 | 6A | B3 | 00 |
| 125 | <0740> | 20 | 00 | 00 | DB | 6A | 09 | 68 | B8 | 5F | BA | 2A | BA | 94 | 22 | 70 | 68 |
| 126 | <0750> | 20 | 84 | 03 | 37 | 5F | 0C | A5 | 5F | 55 | 53 | B8 | 76 | 68 | 20 | 21 | C9 |
| 127 | <0760> | 68 | 5F | 0F | 5F | 00 | 69 | 6A | DA | 6A | 8A | 65 | 10 | 8A | 54 | C9 | 5F |
| 128 | <0770> | DB | 24 | 2F | 5F | C9 | 65 | 5F | 00 | 5F | 10 | 5F | 68 | 00 | B9 | 68 | 00 |
| 129 | <0780> | 5F | 00 | 00 | 20 | 53 | 80 | 15 | 04 | B3 | 2F | 7C | 64 | 11 | 20 | 15 | 20 |
| 130 | <0790> | 20 | 7C | 00 | 07 | 19 | 99 | 05 | 20 | 04 | 27 | 11 | 60 | 20 | 20 | 15 | 70 |
| 131 | <07A0> | 74 | 11 | A4 | 05 | 5F | 5F | 06 | 11 | 15 | 00 | 6C | 15 | 05 | 04 | 11 | 15 |
| 132 | <07B0> | 20 | 19 | 22 | 20 | 70 | 20 | 5F | 20 | 15 | 15 | 11 | 11 | 20 | 20 | 11 | 00 |
| 133 | <07C0> | 5F | 00 | 00 | 14 | 14 | FD | 25 | 14 | 20 | 2F | 7E | 30 | 27 | 14 | 2D | 14 |
| 134 | <07D0> | 14 | 14 | 14 | 5F | 0C | 2E | 15 | 14 | 2F | 00 | 2E | 14 | 14 | 14 | 2B | 3A |
| 135 | <07E0> | 1F | 26 | 2E | 2A | 14 | 2E | 10 | 26 | 2C | 00 | 6B | 27 | 14 | 20 | 2C | 5F |
| 136 | <07F0> | 0C | 14 | 5F | 14 | 14 | 14 | 7F | 40 | 5F | 20 | 2A | 7E | 4F | 14 | 6A | 00 |
| 137 | <0800> | 10 | 24 | 79 | 6E | B5 | C0 | A1 | 63 | 9C | 64 | 79 | 0C | 5F | 67 | 20 | 73 |
| 138 | <0810> | 08 | 68 | 5F | B5 | 00 | 00 | A3 | 5F | 6F | BB | 65 | 9C | 0C | 61 | 0F | 58 |
| 139 | <0820> | 77 | 5F | 5F | 00 | 5F | 9A | 7C | 91 | 54 | 7E | 72 | 68 | 5F | 5F | 9A | A0 |
| 140 | <0830> | 20 | 80 | 7C | 5F | 8E | 00 | 7C | 9F | 58 | 64 | 23 | 5F | 9F | 6F | AA | 00 |
| 141 | <0840> | 21 | 00 | BA | 76 | 69 | 10 | 5F | 5F | 10 | 5F | 14 | 5F | C2 | 07 | 0E | 20 |
| 142 | <0850> | 6E | 7E | 06 | 04 | 31 | 73 | C2 | 5F | 7E | 7E | 1C | C2 | 20 | 7A | 64 | 6F |
| 143 | <0860> | 08 | 07 | 0E | 69 | 7E | 78 | 5F | 10 | 79 | 1B | 85 | 7C | 1D | 7E | 10 | 20 |
| 144 | <0870> | 14 | 06 | C2 | 5F | 39 | 20 | 7E | 10 | 18 | 68 | 5F | AF | 6C | 5F | 53 | 00 |
| 145 | <0880> | 2E | FE | 71 | 5F | 7A | 8C | AB | B6 | 55 | 69 | 40 | A7 | 79 | 55 | 75 |
| 146 | <0890> | 54 | 88 | 2A | 54 | 5F | BC | 0F | 2A | 5F | 24 | 9A | 98 | 5F | 98 |
| 147 | <08A0> | 73 | 40 | 0E | 5F | A6 | 54 | 5F | 00 | 8E | BC | 82 | 0C | 6E | 98 | 5F | 5F |
| 148 | <08B0> | 7E | 75 | 5F | 6E | 5F | AE | 5F | 40 | 91 | 65 | A5 | 54 | 09 | B9 | 10 | 00 |
| 149 | <08C0> | 5F | 40 | 79 | BA | B0 | 65 | 55 | 54 | 6A | 6A | 6B | 66 | 0B | B3 | AB | 5F |
| 150 | <08D0> | 7E | 65 | 5F | AA | 61 | 61 | 5F | 54 | 75 | 5F | 7E | 55 | 5F | 6D | 6E | 55 |
| 151 | <08E0> | 40 | 5F | 6E | 9B | 99 | AC | 54 | 6D | 0F | 23 | 20 | 3A | 0E | 92 | 40 | 8F |
| 152 | <08F0> | 54 | 5F | 85 | 0C | 6E | 5F | 6E | 5F | 9F | 6E | 5F | 6E | 74 | 0D | 2A | 00 |
| 153 | <0900> | 5F | 00 | 05 | BB | 05 | 77 | 55 | 5F | 77 | A9 | B4 | 5F | 56 | 85 | A7 | AB |
| 154 | <0910> | BE | CA | 55 | AC | 7A | 05 | AF | 5F | B2 | 6A | 34 | EA | 7F | 85 | 54 | 92 |
| 155 | <0920> | 74 | 05 | 7E | 79 | 7A | 6A | AB | 04 | 5F | 55 | 37 | 06 | 76 | 1F | 76 |
| 156 | <0930> | 94 | 56 | 5F | 7C | 75 | 7E | 7E | AF | 06 | 92 | 54 | 5F | 04 | 22 | 7C | 00 |
| 157 | <0940> | 05 | 00 | 00 | 6A | 61 | 7F | 5F | 10 | BC | 7C | 76 | 76 | 10 | 9B | 23 | 10 |
| 158 | <0950> | 11 | 53 | 10 | 12 | 10 | 15 | 10 | 19 | 27 | 2E | 27 | 5F | 10 | 12 | 2E | 86 |
| 159 | <0960> | 04 | 2F | 21 | 5F | 5F | 62 | 5F | 5F | 00 | 26 | 5F | 29 | 10 | 18 | 5F | 5F |
| 160 | <0970> | 06 | 15 | 60 | 12 | 0F | 10 | 28 | 60 | 6E | 25 | 5F | 28 | 22 | 11 | 93 | 00 |
| 161 | <0980> | 5F | 00 | 00 | 57 | 55 | 91 | 7A | 5F | 7C | 70 | A5 | 7F | 70 | 5F | B9 | 7A |
| 162 | <0990> | BC | 05 | 5F | 92 | 5F | 55 | 30 | 74 | 99 | 5F | 05 | A4 | 7C | B5 | 5F | A2 |
| 163 | <09A0> | 6A | 9E | 94 | 6E | A4 | 10 | 56 | 57 | 5F | AC | 6D | 9C | 06 | 7F | A2 | 7F |
| 164 | <09B0> | 57 | 56 | 97 | A8 | 68 | 27 | 7C | 80 | 07 | 57 | 7C | 80 | 07 | 10 | 7C | 00 |
| 165 | <09C0> | 5F | 00 | 80 | 04 | A6 | 78 | B6 | 6D | AC | 57 | 7F | 83 | 10 | 54 | 5F | BF |
| 166 | <09D0> | BC | 7C | 7C | 70 | 95 | 5F | BA | 7E | 04 | 7E | 6E | 7D | 7F | 05 | 55 | EC |
| 167 | <09E0> | 36 | 7C | 07 | 54 | 7F | 5F | 5F | 05 | 22 | 57 | A2 | 10 | B3 | 54 | 30 | 75 |
| 168 | <09F0> | 20 | B5 | 1F | 7C | 22 | 5F | 5F | C0 | 63 | BC | 77 | 5F | AF | AE | 74 | 00 |
| 169 | <0A00> | 57 | E6 | 24 | 07 | 5F | 50 | 8E | 05 | 93 | 95 | 6D | 5F | 0E | 57 | 77 | B6 |
| 170 | <0A10> | 30 | 56 | 57 | 0E | 69 | 67 | 82 | 7C | 21 | A9 | 6D | 24 | 7E | AC | 57 | 10 |
| 171 | <0A20> | BB | 7F | 78 | 7C | 06 | 3E | 95 | 07 | 7E | 5F | 06 | AC | 08 | 53 | 10 | 7C |
| 172 | <0A30> | 07 | 61 | 5F | 7F | 10 | 5F | 10 | AC | 7F | 57 | 7C | 5F | 30 | 6C | 7E | 00 |
| 173 | <0A40> | 5F | FD | 24 | 04 | 5F | C0 | 05 | 20 | 14 | 07 | 74 | 07 | 14 | 07 | 29 | 73 |
| 174 | <0A50> | 69 | 20 | 7C | 10 | 16 | 82 | 8C | 68 | 11 | 20 | 78 | 05 | 07 | 5F | 5F | 20 |
| 175 | <0A60> | 74 | 5F | 60 | 15 | 20 | 5F | 20 | 07 | 07 | 5F | 55 | 07 | 20 | 5F | 5F | 15 |
| 176 | <0A70> | 20 | 20 | 10 | 5F | 05 | 5F | 14 | 20 | 15 | 64 | 04 | 11 | 20 | 05 | 11 | 00 |
| 177 | <0A80> | 20 | 00 | 00 | 31 | 9F | 00 | 5F | 5F | 7C | 7C | F3 | 5F | 5F | 06 | 0E | 7D |
| 178 | <0A90> | 59 | 1B | 07 | 56 | 74 | 74 | 10 | 5F | 5F | 20 | BE | 59 | 57 | AD | FD | 80 |
| 179 | <0AA0> | 59 | 1B | 7D | 78 | C0 | 77 | 16 | 6A | 5F | 95 | EC | 69 | 1F | 7C | 8C | 24 |
| 180 | <0AB0> | 10 | 06 | 75 | 5F | 78 | 5F | 18 | 59 | 74 | 3F | 0E | 10 | 69 | 7C | 55 | 00 |
| 181 | <0AC0> | 58 | 00 | 00 | 1B | 11 | A9 | 6E | 10 | 74 | 51 | A9 | 0C | 57 | 10 | 20 | 14 |

```
182 <0AD0> 30 10 70 02 56 06 15 5F 54 01 50 6C 60 A5 8D 34
183 <0AE0> B8 31 28 5F 7E 79 94 20 10 A3 85 08 A5 23 34 8D
184 <0AF0> 6E 7C 5F 10 2A 04 04 1C 5F 67 53 18 06 31 18 00
185 <0B00> 5F 00 80 9D 60 7F 53 52 93 5F 0F B0 93 21 62 10
186 <0B10> 61 A4 C0 05 90 5F 69 60 74 A6 B1 69 30 5F B3 95
187 <0B20> 60 5F 52 89 64 78 64 BB 52 19 10 52 7F 80 5F 5F
188 <0B30> 02 6B 52 20 A9 A9 06 5C 64 53 B1 18 0F 50 04 00
189 <0B40> 5F 00 00 55 BC 00 69 BC 0C A2 00 5F 00 5F A3 BC
190 <0B50> BC 6F 54 00 00 00 BC BC BC 00 BC 55 54 54 A7 67
191 <0B60> 76 A8 55 55 00 6D 00 61 6F 00 00 56 5F 6F AB 54
192 <0B70> 54 A1 00 5F 5F BD 6B BD BE 78 7A BC 6E 55 5F 00
193 <0B80> 71 00 00 08 00 00 5F 56 00 6E 00 11 00 10 6E 5F
194 <0B90> BA 00 10 00 00 00 20 20 60 00 21 5F 5F 10 80 28
195 <0BA0> 50 54 00 9B 00 20 00 1C 20 00 00 53 34 0F 1F 80
196 <0BB0> 5F 62 00 55 90 AE 5D 54 1C 87 71 BF 57 25 B2 00
197 <0BC0> 06 C0 AF 0F 07 7C 62 D1 55 A0 A0 5F 55 5F 55 02

198 <0BD0> 6C 62 52 9C 9C 53 9C 6C 62 6C 9C 9C 0F 6C 9D 53
199 <0BE0> 69 A0 5F 9C 99 60 A9 6C 57 6C 2A 55 55 6C A0 AA
200 <0BF0> A0 5F 9C 55 AB BD AD 5F 5F 92 07 62 0F 52 24 00
201 <0C00> 7F 6E 6F AB 5F 10 0C 6E B6 06 6E 06 6E 6E 6E 2F
202 <0C10> 78 22 27 6E B5 0C 15 2F 5F A9 10 11 57 3A 63 80
203 <0C20> 12 5F 17 0A 6E 5F 00 10 56 55 05 11 60 20 A6 6E
204 <0C30> 70 6E 56 5F B7 2F 20 74 7C 6F 5F 40 7C 5F F7 00
205 <0C40> 1B 00 00 5F 6D 94 AB 54 BC 5F 20 20 55 55 40 6A
206 <0C50> B5 54 6C 5F 0C 5F 5F 5F 6D A5 4E 55 54 5F 5F 9E
207 <0C60> 5F 78 A5 9B 5F 00 95 BB 5F 6E 6E 69 0E 89 8D 5F
208 <0C70> 35 5F 7C 5F 0C 0F 6C 69 10 40 D5 0C 2C 2E 55 00
209 <0C80> 5F D3 7A 55 5F 8B 6E 9F 5F 84 70 BA 6E BE 0D 73 9F
210 <0C90> 5F 9F 7A 40 99 63 55 54 54 10 26 7B 5F 5F 70 00
211 <0CA0> 40 9D 60 5F 40 5F 5F 5F 7B 22 5F B3 96 BD 40 6E
212 <0CB0> 54 40 24 7C 0C 5F 5F 55 02 9F 6E A7 5F 5F 6E 00
213 <0CC0> 5F 00 6E 20 24 0C 37 40 72 DD 5F 53 A9 5F 5F 6E
214 <0CD0> 04 02 71 0C 08 30 23 0C 22 53 AC 71 74 98 0C 40
215 <0CE0> 40 53 53 74 AF 84 72 55 6E 2A 10 5F 53 F3 0F 54
216 <0CF0> 21 21 29 A0 21 66 96 A7 10 5F 53 5F 6C 25 5F 00
217 <0D00> 7E 00 00 B7 52 FB 52 56 BD 13 79 F6 55 B7 9F 75
218 <0D10> C0 70 5F 78 8A F7 7E 7E 80 7A 00 20 20 C8 86 7F
219 <0D20> C8 7F 99 B7 78 9F 5F 1A 7C 56 79 F6 5F 10 10 CD
220 <0D30> 7C 77 40 5F 00 7C 36 77 00 37 7E 44 7F 54 C0 00
221 <0D40> 21 C9 7A 2A 78 6E A8 7E 5F 5F 55 BA 26 83 79 2B
222 <0D50> A3 86 00 B7 BE 78 7C B5 21 A9 93 1F 2C 10 A8 B7
223 <0D60> 53 53 56 7C 3F 7E 2A 53 22 7A 5F A8 84 B2 53 08
224 <0D70> BC 9A 54 9C 5F 2F 5F 29 A8 A8 30 53 24 BF 53 00
225 <0D80> 20 00 75 12 69 69 1F 91 12 5F 5F 06 F7 5F 53 21
226 <0D90> 3E 7F 0F 5F 27 10 69 5F 3E 7C 27 07 7C 25 07 5F
227 <0DA0> 10 5F 0E 06 70 91 04 14 02 3F 59 70 57 5F 00 0A
228 <0DB0> 5F 5F 7C 21 5F BE 92 7C 3A 1C 02 44 7C 5F 44 00
229 <0DC0> 78 A6 2C 20 92 70 14 20 21 14 C0 20 10 25 14 2E
230 <0DD0> 25 0F 20 F7 70 76 14 26 27 22 14 14 2A 14 14 26
231 <0DE0> 02 14 5F 15 14 14 7C 14 14 85 6A 14 14 27 14 14
232 <0DF0> 27 00 00 27 2F 23 2F 20 14 14 14 14 20 23 14 00
233 <0E00> 56 00 96 7C 00 89 F0 5F 7E 7C 55 00 20 77 94 55
234 <0E10> 7C 80 80 74 5F B1 7E 67 8A 9A 20 7E 00 56 38 04
235 <0E20> BD 90 7E 3F 10 7C 59 7C 0A 4A 1F 6D 7C 80 6E 6E
236 <0E30> 5F 54 7C 05 5F 5F 80 0C 38 6E 78 6E 54 5F B7 00
237 <0E40> 5F 00 00 7C 00 00 0F A3 00 00 00 00 00 69 78 0E
238 <0E50> 23 00 00 00 00 00 00 33 00 00 5F 00 10 C3 7B 7A
239 <0E60> 6F 61 00 00 00 00 00 5F 53 00 7C 00 00 75 00
240 <0E70> 7C 00 00 1C BE D8 00 7C 59 20 78 D8 7C 5F F6 00
241 <0E80> 5F C0 77 5F 38 93 10 5F 5F 5F 7C 78 75 20 10 6F
242 <0E90> 20 AF BC 5B 7C 20 5F 7C 10 40 64 7A 73 20 55 6C
243 <0EA0> 00 6B 54 02 62 56 EA 21 10 6E F7 1B 7D 1F 6E 74
244 <0EB0> 52 20 7A 10 5F 5F 7C 25 97 5F 7C 5F 07 17 5F 00
245 <0EC0> 52 00 00 64 6C 00 6F 64 6C 1B 00 18 00 6E AD 55
246 <0ED0> BE 18 17 00 00 00 2F 54 AD 00 54 AF AE 9E 6C 56
247 <0EE0> 83 92 19 55 10 6C 00 87 AD 00 00 AC 64 5F 6C A4
248 <0EF0> 64 AF AF 64 64 64 64 64 52 55 55 56 5E 6E 6E 00
249 <0F00> 76 00 00 80 69 00 54 18 04 BC 00 26 5E 21 50 6A
250 <0F10> 5F 6B 69 31 9D 92 5E 00 10 5F 5F B0 0C 5F 9D 7E
251 <0F20> C0 04 9D 3F 6B 10 18 A9 70 AA 10 6C 5A 5F 19 5F
252 <0F30> 5B 30 04 5F 55 A0 AD AE BE A6 AF 55 B0 B0 74 00
253 <0F40> 04 63 70 62 0F 00 5F B1 74 6A 65 6A 69 A7 56 61
```

```
254 (0F50) 69 5F 82 82 30 5F B2 BA 03 40 27 6A 65 66 77 0C
255 (0F60) 6A 0C 82 8C 0E 37 3A 76 3A 6A B2 05 9B 30 55 00
256 (0F70) 3C 69 70 62 BC 68 BC 5F B7 5F 5F 6A 5F 0C 77 00
257 (0F80) 20 00 00 69 20 00 00 5F 00 00 00 5F 00 69 83 5F
258 (0F90) 5F 5F 74 00 00 00 04 11 11 85 00 74 80 87 40 53
259 (0FA0) 53 40 10 00 27 00 00 0F 0F 00 00 0C 0C 6B 20 85
260 (0FB0) BE 20 10 28 29 6B 6B 25 74 53 53 0F 11 69 20 00
261 (0FC0) 5F 04 73 6C BL 0A 5F B0 B0 6A BC 6E 6C 0C 6A B3
262 (0FD0) 9B 6A 00 6A 6A 6A 5F 0F AC 5F 21 7E 54 0E 53 21
263 (0FE0) 1E 57 05 06 00 07 0F 6E 5F BC BC 6F 0F 65 6F 53
264 (0FF0) 20 6A 6E 5F 70 5F 6E 00 53 24 07 6E B3 22 0E 00
```

What is claimed is:

1. A hand-held electronic game comprising:
a plurality of manually operable control switches for permitting control of the play of the game by a player;
sound transducer means for generating sound responsive to sound signals;
control circuit means coupled to the control switches and the sound transducer means, and including a processor, a read-only memory, and a random access memory, for generating game control signals and sound signals;
display means having selectively activatable image segments corresponding to a plurality of player-controlled figures, including plurality of aiming cross hair images, and multi-bar energy gauge images, each defining one of a plurality of independent regions, game controlled figures, including a plurality of wave and cloud image segments, and alpha-numeric game information for selective display thereof, said display means responsive to said control circuit means control signals for display of game images such that a player-controlled figure is visually displayed at one of a plurality of pre-determined positions and the position at which the player-controlled figure is displayed is moveable to an adjacent position responsive to player activation of a control switch, and such that game controlled attack craft image segments comprising sequences of aircraft and aircraft carriers are selectively displayed one at a time in a sequence to simulate the approach of an attacking craft, in sequentially psuedo-randomly selected ones of the plurality of independent regions, simulating a sequence of attacks within different selected independent regions having a pattern substantially unknown to the player, said control circuit further comprising means for generating control signals to activate explosion indicating image segments responsive to the player moving the player controlled figure to the region of the displayed attacking craft within a predetermined time of its display together with activation of a firing control switch within the predetermined time, and said processor further comprising means for controlling display of missile firing indicia to simulate firing a missile by the player responsive to activation by the player of the firing control switch, means for controlling display of game controlled sequences of enemy missile images to simulate approach of enemy missiles in a pattern substantially unknown to the player, means for controlling display of explosion image segments to simulate destruction of a player aircraft responsive to failure of the player to destroy the enemy missile within a predetermined time after the first display of the enemy missile, means for accumulating a score and controlling display of a score responsive to simulated destruction of attacking craft, means for controlling display of the energy gauge to reduce displayed bars of the energy gauge in response to failure by the player to destroy an attacking aircraft and aircraft carriers, and means for controlling the display of the wave and cloud image segments in a sequence to simulate depth and motion.

* * * * *